United States Patent
Hyun et al.

(10) Patent No.: US 8,363,132 B2
(45) Date of Patent: Jan. 29, 2013

(54) APPARATUS FOR DEMOSAICING COLORS AND METHOD THEREOF

(75) Inventors: Ji Cheol Hyun, Yangcheon-gu (KR); Seung Heon Jeon, Guro-gu (KR)

(73) Assignee: Dongbu HiTek Co., Ltd., Seoul (KR)

( * ) Notice: Subject to any disclaimer, the term of this patent is extended or adjusted under 35 U.S.C. 154(b) by 480 days.

(21) Appl. No.: 12/648,929

(22) Filed: Dec. 29, 2009

(65) Prior Publication Data

US 2010/0165157 A1  Jul. 1, 2010

(30) Foreign Application Priority Data

Dec. 30, 2008  (KR) ........................ 10-2008-0136928

(51) Int. Cl.
*H04N 5/335* (2006.01)
(52) U.S. Cl. ...................... 348/273; 348/272; 348/280
(58) Field of Classification Search ..... 348/222.1–230.1
See application file for complete search history.

(56) References Cited

U.S. PATENT DOCUMENTS

| | | | |
|---|---|---|---|
| 6,882,365 B1 * | 4/2005 | Aoki | 348/273 |
| 7,554,583 B2 * | 6/2009 | Kuno et al. | 348/241 |
| 2001/0045988 A1 * | 11/2001 | Yamauchi et al. | 348/273 |
| 2003/0011708 A1 * | 1/2003 | Kawamura et al. | 348/448 |
| 2004/0017852 A1 * | 1/2004 | Garrido et al. | 375/240.16 |
| 2009/0109296 A1 * | 4/2009 | Kuno et al. | 348/222.1 |
| 2009/0115870 A1 * | 5/2009 | Sasaki | 348/223.1 |
| 2009/0147093 A1 * | 6/2009 | Tang | 348/222.1 |

* cited by examiner

*Primary Examiner* — Chieh M Fan
*Assistant Examiner* — Dwight C Tejano
(74) *Attorney, Agent, or Firm* — Sherr & Jiang, PLLC

(57) ABSTRACT

An apparatus and method for demosaicing colors in an image sensor can accurately locate edge directionality by detecting a successive 1-line edge precisely. The embodiments may include an image sensor containing information on a color signal detected from each pixel, a first line memory receiving and storing output data from the image sensor, a missing green information extractor extracting missing green pixel information from the data of the first line memory, a delayer receiving the data of the first line memory, the delayer delaying the received data for a prescribed duration, the delayer outputting the delayed data, a second line memory temporarily storing the data outputted from the missing green information extractor and the data provided via the delayer, and a missing red/blue information outputter extracting missing red/blue information from the data of the second line memory.

18 Claims, 5 Drawing Sheets

FIG. 1

Figure 2:
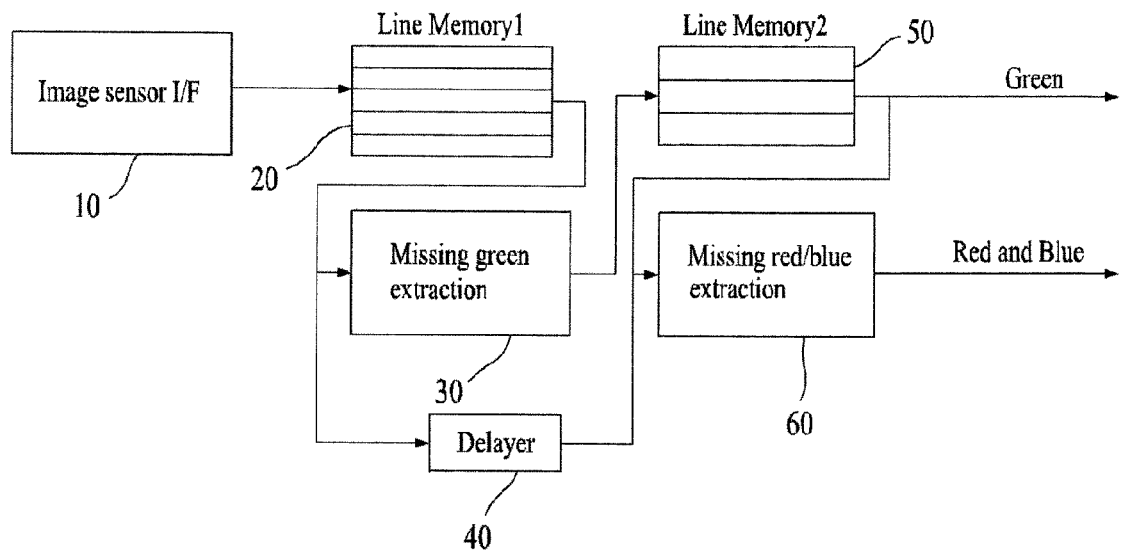

| R 1,1 | G 1,2 | R 1,3 | G 1,4 | R 1,5 |
|---|---|---|---|---|
| G 2,1 | B 2,2 | G 2,3 | B 2,4 | G 2,5 |
| R 3,1 | G 3,2 | R 3,3 | G 3,4 | R 3,5 |
| G 4,1 | B 4,2 | G 4,3 | B 4,4 | G 4,5 |
| R 5,1 | G 5,2 | R 5,3 | G 5,4 | R 5,5 |

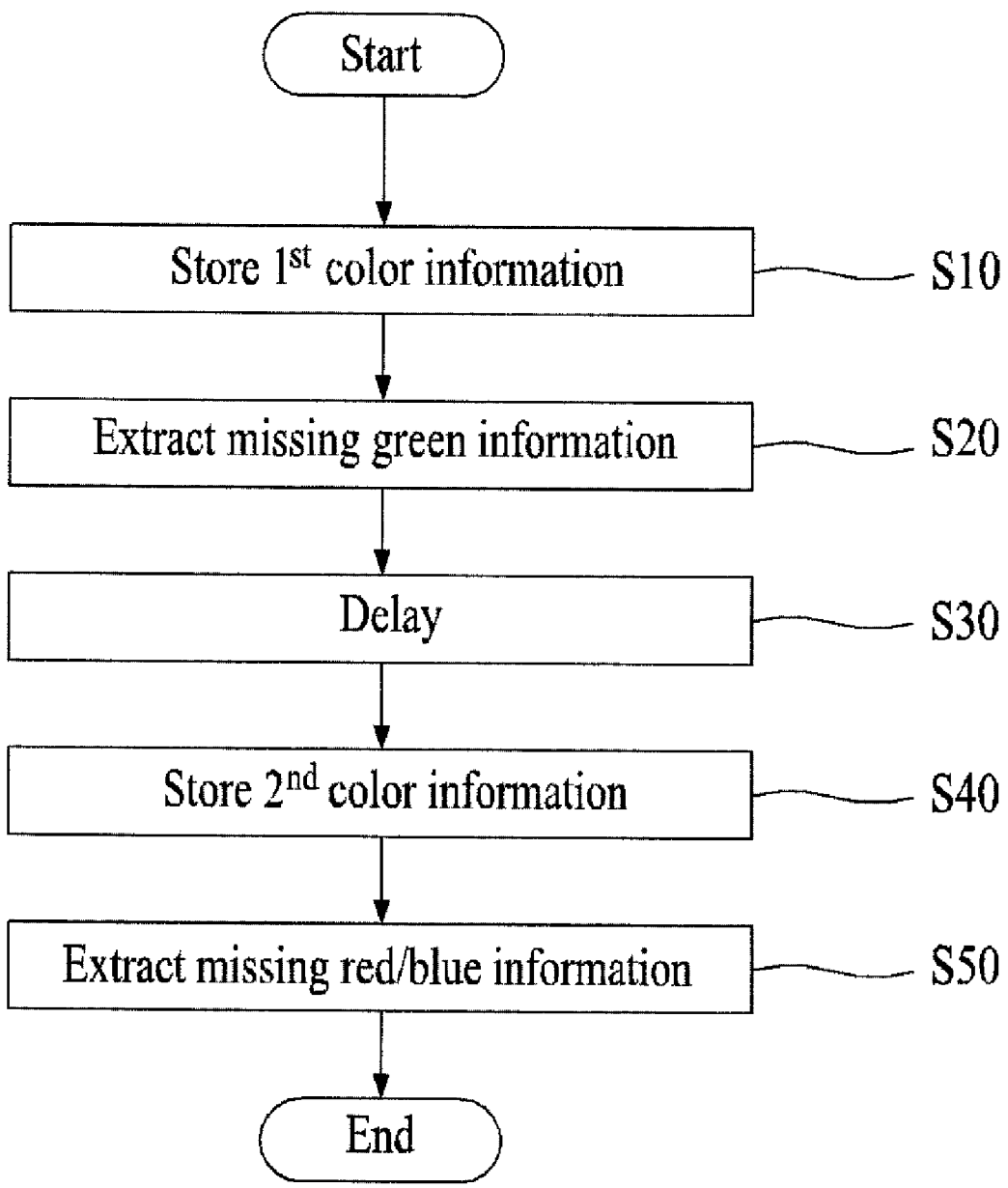

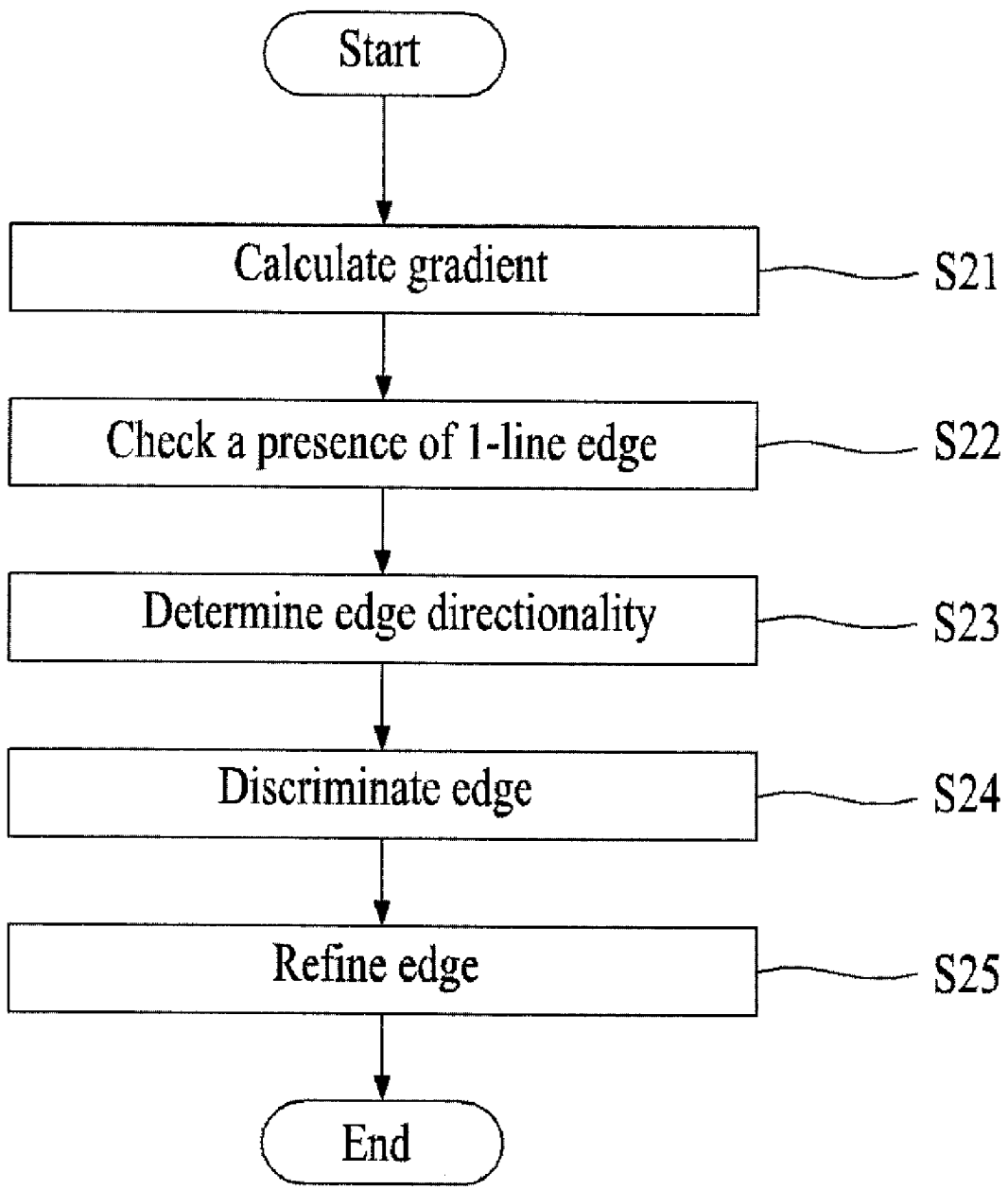

APPARATUS FOR DEMOSAICING COLORS AND METHOD THEREOF

The present application claims priority under 35 U.S.C. 119 to Korean Patent Application No. 10-2008-0136928 (filed on Dec. 30, 2009), which is hereby incorporated by reference in its entirety.

BACKGROUND

An image capture device capable of capturing a digital image such as a digital camera, a cellular phone, and the like includes an image sensor. The image sensor includes a 2-dimensional array sensor. Each sensor is located at 'pixel position'. Each sensor detects intensity of one color of light. In general, there may be a green sensor, a red sensor and a blue sensor.

Various kinds of pixel array types adopted by CCD or CMOS image sensors exist. Yet, due to the facilitation of pixel design, excellent color reproducibility and process yield, most of the image sensors adopt the Bayer pattern shown in FIG. 1. According to a method of visualizing colors and images, red and blue may be sub-sampled for sampling of green by an image sensor. An uppermost row of a sensor includes alternating green and red pixels. A row next to the uppermost row includes green and blue pixels. The order of the sensors is generated row by row vertically below in an image sensor.

The, the number of green pixels G is greater than that of red or blue pixels R or B. The number of the green pixels G is equal to a sum of the numbers of red and blue pixels R and B. Thus, the number of the green pixels G is relatively greater than that of the red or blue pixels R or B. This is because a green color is closest to a luminance component and because a human eye reacts to the green color most sensitively.

Therefore, the image sensor shown in FIG. 1 has more green sensors than red or blue sensors. This can be called 'red and blue sub-sampling'. One color sample value is taken from each pixel position on an image sensor only. For instance, each color sample value may have an 8-bit value for example.

Generally, an image has one pixel constructed with red, green and blue. Yet, referring to FIG. 1, the Bayer pattern has one pixel constructed with one color such as red, green and blue. In order to reconstruct a full image, color information missed from each pixel should be interpolated using neighbor pixels.

Many efforts are ongoing to be made to interpolate the missed color information accurately. Yet, if incorrect neighbor pixel information in a high-frequency area of an image is used, an artificial video of an image is displayed.

To solve this problem, there are studied techniques described in Color Demosaicing Using Variance Of Color Correlation, Effective Color Interpolation in CCD Color Filter Arrays Using Signal Correlation, etc. Regarding these techniques, edge sensing reduces incorrect pixel information but enables more precise pixel information to be acquired. Therefore, interpolation (demosaicing) is performed by acquiring precise pixel information through edge sensing.

A Hamilton edge classifier may be used for the edge sensing, which is represented as Formula 1. An image sensor includes a 2-dimensional array of color sensors for rows and columns. Each of the color sensors is located at one pixel position and then detects one color. In this example, each of the color sensors generates an 8-bit color subpixel value.

The indication 'Gij' is used to indicate a color subpixel value. A front capital letter indicates a detected color. If this letter is 'R', a detected color is red. If this letter is 'G', a detected color is green. If this letter is 'B', a detected color is blue. A notation by two numerals 'ij' follows the front letter. In this notation, a first numeral 'i' indicates a row of a subpixel value and a second numeral 'j' indicates a column off the subpixel value.

$$\Delta H_{i,j} = |G_{i,j-1} - G_{i,j+1}| + |2R_{i,j} - R_{i,j-2} - R_{i,j+2}|$$

$$\Delta V_{i,j} = |G_{i,j-1} - G_{i,j+1}| + |2R_{i,j} - R_{i-2,j} - R_{i+2,j}| \quad \text{[Formula 1]}$$

In Formula 1, if a current position of a pixel for finding missed color information from an image is (i, j), a missed green value can be found according to Formula 2 by finding horizontal and vertical gradients and then determining whether an edge component in a horizontal direction or an edge component in a vertical direction is dominant.

$$g_{i,j} = \frac{G_{i,j-1} + G_{i,j+1}}{2} + \frac{(2R_{i,j} - R_{i,j-2} - R_{i,j+2})}{4} \quad \text{[Formula 2]}$$

if $\Delta H_{i,j} < \Delta V_{i,j}$ $$g_{i,j} = \frac{G_{i-1,j} + G_{i+1,j}}{2} + \frac{(2R_{i,j} - R_{i-2,j} - R_{i+2,j})}{4}$$

if $\Delta H_{i,j} > \Delta V_{i,j}$ $$g_{i,j} = \frac{G_{i-1,j} + G_{i+1,j} + G_{i,j-1} + G_{i,j+1}}{4} + \frac{(4R_{i,j} - R_{i-2,j} - R_{i+2,j} + R_{i,j-2} - R_{i,j+2})}{4}$$

if $\Delta H_{i,j} = \Delta V_{i,j}$

Even if Formula 1 and Formula 2 are used, if a successive 1-line narrow edge exists, Formula 1 is insufficient to perfectly discriminate accurate directionality of an edge. Hence, error of demosaicing occurs.

For this, an edge-sensing scheme in a 9×9 kernel using color correlation is introduced in Color Demosaicing Using Variance Of Color Correlation. Although 'Effective Color Interpolation in CCD Color Filter Arrays Using Signal Correlation' introduces a scheme of supplementing the above-described Hamilton edge-classifier, if a successive 1-line narrow edge exists, there still exists an incorrect edge sensing.

SUMMARY

Embodiments relate to an image sensor, and more particularly, to an apparatus for demosaicing colors in an image sensor and method thereof. Embodiments relate to an apparatus for demosaicing an image and method thereof, by which a high-quality image can be provided. Embodiments relate to a demosaicing apparatus and method thereof, by which information on a neighbor pixel can be acquired by performing edge sensing in a high-frequency region accurately. Embodiments also relate to a demosaicing apparatus and method, by which a disadvantage caused by edge-sensing error occurring in a region where a successive 1-line narrow edge exists.

Embodiments relate to an apparatus for demosaicing colors which may include: include an image sensor containing information on a color signal detected from each pixel, a first line memory receiving and storing output data from the image sensor, a missing green information extractor extracting missing green pixel information from the data of the first line memory, a delayer receiving the data of the first line memory, the delayer delaying the received data for a prescribed duration, the delayer outputting the delayed data, a second line memory temporarily storing the data outputted from the missing green information extractor and the data provided via the delayer, and a missing red/blue information outputter extracting missing red/blue information from the data of the second line memory.

The missing green information extractor may include a gradient calculating unit finding a gradient in a current pixel, a line edge determining unit comparing a minimum/maximum difference value of green pixel values within a kernel to a threshold, the line edge determining unit determining a presence or non-presence of a successive 1-line edge region according to a result of the comparison, a directionality determining unit determining directionality of an edge in a current center pixel through edge sensing for 8 neighbor pixels centering on a center pixel, an edge classifying unit discriminating one value selected from the group consisting of a plain plane, a successive 1-line edge region, a vertical edge region, a horizontal edge region and a texture edge region based on values provided by the gradient calculating unit and the line edge determining unit, and an edge refining unit modifying a neighbor edge direction using values provided by the edge classifying unit and the directionality determining unit and a threshold.

Embodiments relate to a method of demosaicing colors which may include a first color information storing step of receiving and storing information on a color signal detected in each cell from an image sensor, a missing green information extracting step of extracting missing green pixel information in the first color information storing step, a delaying step of delaying the first color information data for a prescribed duration and then outputting the delayed data, a second color information storing step of storing data extracted through the missing green information extracting step and data provided via the delaying step, and a missing red/blue information outputting step of extracting missing red/blue information from the data stored in the second color information storing step.

The missing green information extracting step may include the steps of finding a gradient in a current pixel, comparing a minimum/maximum difference value of green pixel values within a kernel to a threshold and then determining a presence or non-presence of a successive 1-line edge region according to a result of the comparison, determining directionality of an edge in the current center pixel through edge sensing for 8 neighbor pixels centering on a center pixel, an edge classifying step of discriminating one value selected from the group consisting of a plain plane, a successive 1-line edge region, a vertical edge region, a horizontal edge region and a texture edge region based on the gradient value and a presence or non-presence of a 1-line edge region, and an edge refining step of modifying a neighbor edge direction using a threshold based on the classified edge and directionality of the edge.

DRAWINGS

FIG. 1 is a diagram for an example of Bayer pattern.

Example FIG. 2 is a block diagram of a color demosaicing apparatus according to embodiments.

Figure 3:
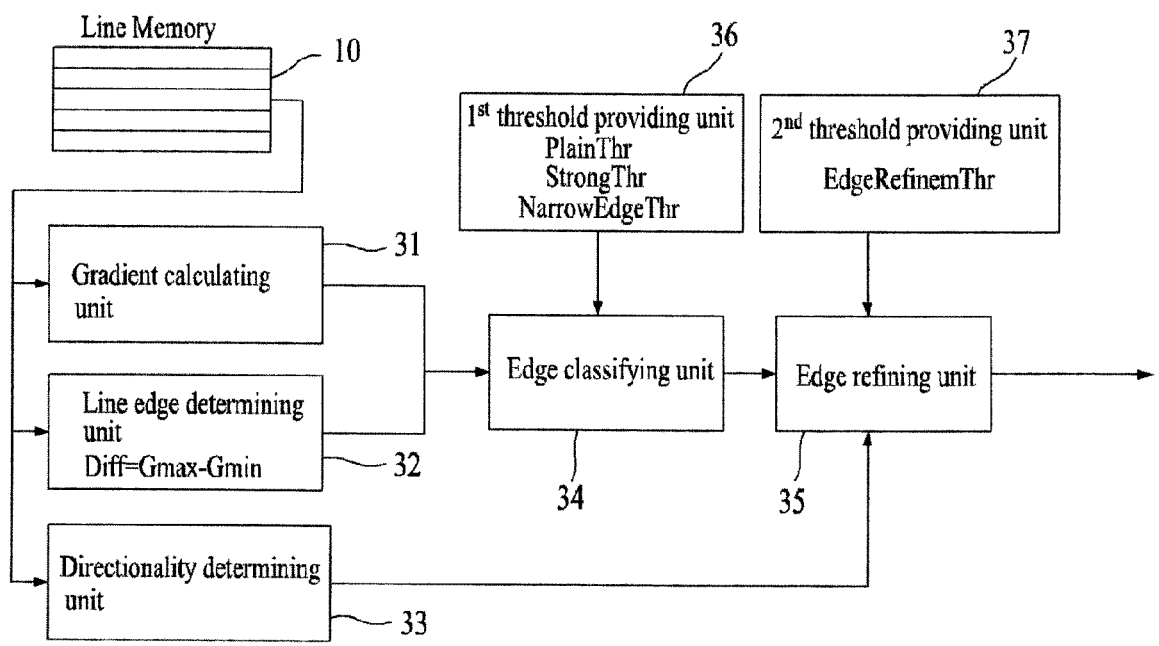

Example FIG. 3 is a detailed block diagram of a color demosaicing apparatus according to embodiments.

Figure 4:
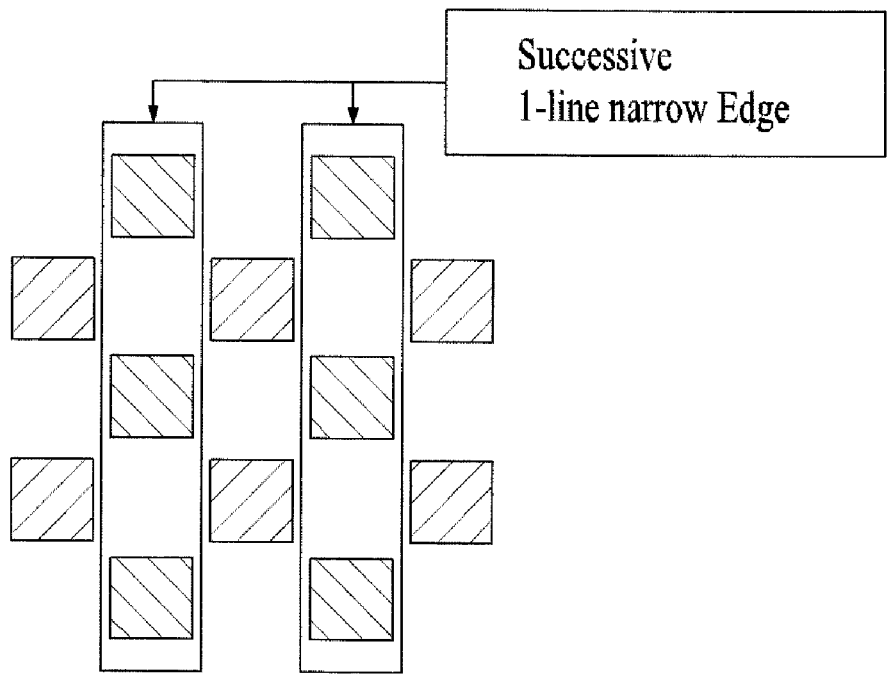

Example FIG. 4 is a exemplary diagram of green component information in kernel having a successive narrow edge region.

Figure 5:
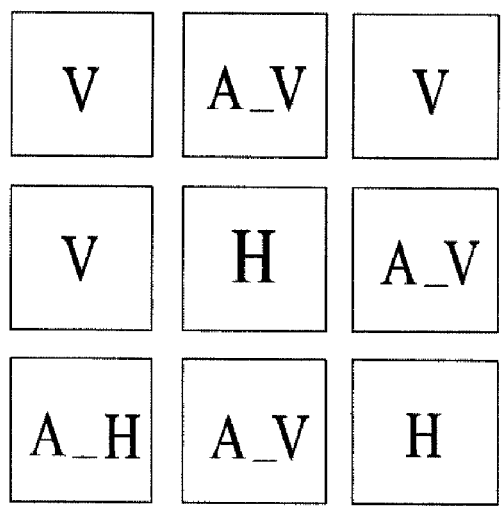

Example FIG. 5 is an exemplary diagram of an edge directionality map.

Example FIG. 6 is a flowchart for a progress of a color demosaicing method according to embodiments.

Example FIG. 7 is a flowchart for a detailed progress of a color demosaicing method according to embodiments.

DESCRIPTION

A color demosaicing apparatus according to embodiments, as shown in FIG. 2, may include an image sensor 10 containing information on a color signal detected from each pixel, a first line memory 20 receiving and storing output data from the image sensor 10, a missing green information extractor 30 extracting missing green pixel information by supplementing a fault of incorrect edge sensing in a region, in which 1-line narrow edge successive in data of the first line memory 20 exists, a delayer 40 receiving the data of the first line memory 20, the delayer 40 delaying the received data for a prescribed duration, the delayer 40 outputting the delayed data, a second line memory 50 temporarily storing the data outputted from the missing green information extractor 30 and the data provided via the delayer 40, and a missing red/blue information outputter 60 extracting missing red/blue information from the data of the second line memory 50.

An edge classifier exists in the missing green pixel information extractor 30 shown in FIG. 2. The edge classifier extracts green, as shown in FIG. 2, and then extracts red and blue using corresponding values.

Example FIG. 3 is a detailed block diagram of a color demosaicing apparatus according to embodiments. Referring to FIG. 3, the missing green information extractor may include a gradient calculating unit 31 finding a gradient in a current pixel, a line edge determining unit 32 comparing a minimum/maximum difference value between green pixel values within a kernel to a threshold, the line edge determining unit 32 determining a presence or non-presence of a successive 1-line edge region according to a result of the comparison, a directionality determining unit 33 determining directionality of an edge in a current center pixel through edge sensing for 8 neighbor pixels centering on a center pixel, an edge classifying unit 34 discriminating one of a plain plane, a successive 1-line edge region, a vertical edge region, a horizontal edge region and a texture edge region based on values provided by the gradient calculating unit 31 and the line edge determining unit 32, and an edge refining unit 35 modifying a neighbor edge direction using values provided by the edge classifying unit 34 and the directionality determining unit 34 and a threshold.

The gradient calculating unit 31 may be a block for finding a gradient value in a current pixel. The gradient calculating unit 31 uses a calculation scheme resulting from modifying a gradient calculating scheme using a color difference proposed by 'Color Demosaicing Using Variance Of Color Correlation'. Namely, in 'Color Demosaicing Using Variance Of Color Correlation' according to a related art, a variance of color differences of neighbor pixels within a kernel is found for more accurate edge sensing. Yet, since this method requires heavy operational load, Formula 3 and Formula 4 are applied.

$$K_U{}^H=[(img_{i,j-1}+img_{i,j+1})>>1]+[(img_{i,j-2}+2*img_{i,j}+img_{i,j+2})>>2]$$

$$K_U{}^V=[(img_{i-1,j}+img_{i+1,j})>>1]+[(img_{i-2,j}+2*img_{i,j}+img_{i+2,j})>>2] \quad \text{[Formula 3]}$$

, where horizontal and vertical weights are $K_{i,j}{}^h$ and, $K_{i,j}{}^V$ respectively.

Formula 4 indicates a color difference between neighbor pixels and is represented as follows.

$$dH=|K_{i,j}^H-K_{i,j-2}^H|+|K_{i,j}^H-K_{i,j+2}^H|$$

$$dV=|K_{i,j}^V-K_{i-2,j}^V|+|K_{i,j}^V-K_{i+2,j}^V| \quad \text{[Formula 4]}$$

The line edge determining unit 32 is a block newly added to the related art edge classifier. In a high frequency region where 1-line narrow edges appear successively, a color difference (dH, dV) is represented as a very small value. So, it is difficult to discriminate whether this region is a region having an edge exist therein or a plain plane region with no edge.

Example FIG. 4 is an exemplary diagram of green component information in kernel having a successive narrow edge region. Referring to FIG. 4, even if a gradient for green is found in a vertical or horizontal direction, it is able to expect an almost same value.

Yet, if minimum and maximum values of green values within the kernel are found and a difference between the minimum and maximum values is then found, the value difference is considerably big unlike the case of the plain plane. Accordingly, in order to discriminate the successive 1-line edge region and the plain plane region from each other, the edge classifier 34 of embodiments finds minimum and maximum values of green values within the kernel. If the difference value exceeds a specific threshold (narrowEdgeThr), it is determined as a region whether the 1-line edge exists.

The directionality determining unit (local gradient) 33 is a block newly added to the related art edge classifier. Simple edge sensing is performed on 8 neighbor pixels with reference to a center pixel within the kernel. In this case, the corresponding edge classification uses Hamilton edge sensing scheme like that in Formula 1 and Formula 2.

The edge classifier 34 preferentially detects directionality of an edge in a current center pixel using the inputted gradient values and the minimum/maximum difference of the green values within the kernel. Subsequently, a reference for performing refinement, one more time, on whether the currently found directionality of the edge is a correct value, is prepared.

The edge classifier 34 compares the values provided by the gradient calculating unit 31 and the line edge determining unit 32 to the PlainThr, StrongThr, NarrowEdgeThr values provided by the first threshold providing unit 36 to discriminate into one of a lain plane, a successive 1-line edge region, a vertical edge region, a horizontal edge region and a texture edge region.

According to Formula 2 of the related art, by comparing the vertical gradient value to the horizontal gradient value, an edge according to one of $\Delta H > \Delta V$, $\Delta H < \Delta V$ and $\Delta H = \Delta V$ is determined. Yet, embodiments make this determination in a following manner.

1. If $\Delta H$ is equal to or smaller than a plain threshold plainThr, $\Delta V$ is equal to or smaller than plainThr and a difference diffMinMaxVal between minimum and maximum is equal to or smaller than a narrowedge threshold narrowEdgethr, it is determined as a plain plane.

2. If $\Delta H$ is equal to or smaller than a plain threshold plainThr, $\Delta V$ is equal to or smaller than plainThr and a difference diffMinMaxVal between minimum and maximum is greater than a narrowedge threshold narrowEdgethr, it is determined as a successive 1-line edge region.

3. If $\Delta H$ is greater than a value resulting from adding a strong threshold to $\Delta V$, it is determined as a vertical edge region.

4. If $\Delta V$ is greater than a value resulting from adding a strong threshold to $\Delta H$, it is determined as a horizontal edge region.

5. Otherwise, it is determined as a texture edge region.

Meanwhile, the edge refining unit (edge refinement) 35 uses the gradient value found by the directionality determining unit (local gradient block) 33 as a reference.

The corresponding example is shown in FIG. 5. Example FIG. 5 shows an example of configuring an edge direction map of neighbor pixels using values outputted from the directionality determining unit (local gradient block) 33. An edge direction of a current center pixel is determined as a horizontal direction, while neighbor pixels have edge direction mainly determined as a vertical direction. In this case, the edge directionality of the rest of pixels except the center sets the criterion for an edge direction by applying the following rules.

```
edgeCriterion = 0;
for indxR = −1 : 1
  for indxC = −1 : 1,
    if (indxR != 0) & (indxC != 0)
      if edgeMap(i+indxR,j+indxC == V
        edgeCriterion += 2;
      elseif edgeMap(i+indxR,j+indxC == A_V
        edgeCriterion += 1;
      elseif edgeMap(i+indxR,j+indxC == A_H
        edgeCriterion −= 1;
      elseif edgeMap(i+indxR,j+indxC == H
        edgeCriterion −= 2;
    End
  End
 End
End
```

Thus, if the edge criterion value is equal to or greater than a predetermined threshold, edge directionality information of a center pixel is modified. In the example of FIG. 5, if an edge criterion is 6 and a threshold (edge RefinementThr) provided by the second threshold providing unit 37 is 5, as the edge criterion exceeds the threshold, edge directionality of a center pixel is modified into 'vertical (V)'.

Example FIG. 6 is a flowchart for a progress of a color demosaicing method according to embodiments. Referring to FIG. 6, information on a color signal detected from each pixel is received from an image sensor and is then stored (1st color data storing) [S10].

By supplementing a fault of incorrect edge sensing on a region having a successive 1-line narrow edge exist therein, mixing green information for extracting missing green pixel information is extracted (Missing green pixel estimation) [S20]. The stored color information data are delayed for prescribed duration and are then outputted (delaying) [S30]. The data extracted through the missing green information extracting process and the data provided through the delaying are stored (2nd color data storing) [S40]. Finally, missing red and blue information is extracted from the data after completion of the mixing green information extraction (Missing Red and Blue pixel estimation) [S50].

Example FIG. 7 is a flowchart for a detailed progress of a color demosaicing method according to embodiments. Particularly, FIG. 7 shows the missing green pixel estimation in detail. Referring to FIG. 7, a gradient value in a current pixel is calculated (calculating gradient using color diff) [S21].

By comparing a minimum/maximum difference value of green pixel values within a kernel to a threshold, it is determined whether a successive 1-line edge region exists according to a result of the comparison (Diff=Gmax−Gmin) (S22). Through edge sensing on 8 neighbor pixels with reference to a center pixel, directionality of an edge in a current center cell is determined (Local gradient at neighbor 8 pixels) [S23].

Based on the gradient value and a presence or non-presence of the 1-line edge region, it is discriminated into one of plain plane, successive 1-line edge region, vertical edge region, horizontal edge region and texture edge region (Edge–classifier) [S24]. Based on the classified edge and the directionality of the edge, a neighbor edge direction is modified using a threshold (Edge-sensing refinement) [S25].

Accordingly, embodiments provide the following effects and/or advantages. First of all, embodiments are able to accurately find edge directionality of a current pixel in the Bayer pattern. Secondly, embodiments are able to accurately detect a 1-line edge, thereby enhancing performance of an edge classifier. Thirdly, the accuracy of color demosaicing of in Bayer pattern is improved.

It will be obvious and apparent to those skilled in the art that various modifications and variations can be made in the embodiments disclosed. Thus, it is intended that the disclosed embodiments cover the obvious and apparent modifications and variations, provided that they are within the scope of the appended claims and their equivalents.

What is claimed is:

1. An apparatus comprising:
    an image sensor containing information on a color signal detected from each pixel;
    a first line memory receiving and storing output data from the image sensor;
    a missing green information extractor extracting missing green pixel information from the data of the first line memory;
    a delayer receiving the data of the first line memory, the delayer delaying the received data for a prescribed duration, the delayer outputting the delayed data;
    a second line memory temporarily storing the data outputted from the missing green information extractor and the data provided via the delayer; and
    a missing red/blue information outputter extracting missing red/blue information from the data of the second line memory,
    wherein the missing green information extractor extracts the missing green pixel information from the data of the first line memory by supplementing a fault of the incorrect edge sensing in a region where a successive 1-line narrow edge exists.

2. The apparatus of claim 1, wherein the missing green information extractor includes a gradient calculating unit for finding a gradient in a current pixel.

3. The apparatus of claim 2, wherein the missing green information extractor includes a line edge determining unit comparing a minimum/maximum difference value of green pixel values within a kernel to a threshold.

4. The apparatus of claim 3, wherein the line edge determining unit is configured to determine one of a presence and a non-presence of a successive 1-line edge region according to a result of the comparison.

5. The apparatus of claim 4, wherein the missing green information extractor includes a directionality determining unit determining directionality of an edge in a current center pixel through edge sensing for 8 neighbor pixels centering on a center pixel.

6. The apparatus of claim 5, wherein the missing green information extractor includes an edge classifying unit configured to discriminate one value selected from the group consisting of a plain plane, a successive 1-line edge region, a vertical edge region, a horizontal edge region and a texture edge region.

7. The apparatus of claim 6, wherein the edge classifying unit is configured to discriminate the one value based on values provided by the gradient calculating unit and the line edge determining unit.

8. The apparatus of claim 7, wherein the missing green information extractor includes an edge refining unit configured to modify a neighbor edge direction.

9. The apparatus of claim 8, wherein the edge refining unit is configured to modify the neighbor edge direction using values provided by the edge classifying unit and the directionality determining unit, and using a threshold.

10. The apparatus of claim 9, wherein the gradient calculating unit uses color demosaicing using variance of color correlation.

11. The apparatus of claim 10, wherein the gradient calculating unit applies equations, which define a color difference between neighbor pixels, to color demosaicing using variance of color correlation, including:

$$dH=|K_{i,j}^H-K_{i,j-2}^H|+|K_{i,j}^H-K_{i,j+2}^H|$$

and $$dV=|K_{i,j}^V-K_{i-2,j}^V|+|K_{i,j}^V-K_{i+2,j}^V|$$

wherein the indication 'Kij' is used to indicate a color subpixel value, i indicates a row of a subpixel value, j indicates a column off the subpixel value, dH indicates a horizontal gradient, dV indicates a vertical gradient.

12. The apparatus of claim 11, wherein horizontal and vertical weights are set to $$K_U^H=[(img_{i,j-1}+img_{i,j+1})>>1]+[(img_{i,j-2}+2*img_{i,j}+img_{i,j+2})>>2]$$

and $$K_U^V=[(img_{i-1,j}+img_{i+1,j})>>1]+[(img_{i-2,j}+2*img_{i,j}+img_{i+2,j})>>2],$$

respectively.

13. A method comprising:
    a first color information storing step of receiving and storing information on a color signal detected in each cell from an image sensor;
    a missing green information extracting step of extracting missing green pixel information in the first color information storing step by supplementing a fault of the incorrect edge sensing in a region where a successive 1-line narrow edge exists in the first color information storing step;
    a delaying step of delaying the first color information data for a prescribed duration and then outputting the delayed data;
    a second color information storing step of storing data extracted through the missing green information extracting step and data provided via the delaying step; and
    a missing red/blue information outputting step of extracting missing red/blue information from the data stored in the second color information storing step.

14. The method of claim 13, wherein the missing green information extracting step includes finding a gradient in a current pixel.

15. The method of claim 14, wherein the missing green information extracting step includes comparing a minimum/maximum difference value of green pixel values within a kernel to a threshold and then determining a presence or non-presence of a successive 1-line edge region according to a result of the comparison.

16. The method of claim 15, wherein the missing green information extracting step includes determining directionality of an edge in the current center pixel through edge sensing for 8 neighbor pixels centering on a center pixel.

17. The method of claim 16, wherein the missing green information extracting step includes an edge classifying step of discriminating one value selected from the group consisting of a plain plane, a successive 1-line edge region, a vertical edge region, a horizontal edge region and a texture edge region based on the gradient value and a presence or non-presence of a 1-line edge region.

18. The method of claim 17, wherein the missing green information extracting step includes an edge refining step of modifying a neighbor edge direction using a threshold based on the classified edge and directionality of the edge.

* * * * *